US010142358B1

(12) United States Patent
Bajpai et al.

(10) Patent No.: US 10,142,358 B1
(45) Date of Patent: Nov. 27, 2018

(54) SYSTEM AND METHOD FOR IDENTIFYING AN INVALID PACKET ON A CONTROLLER AREA NETWORK (CAN) BUS (71) Applicant: Symantec Corporation, Mountain View, CA (US)

(72) Inventors: Vishal Bajpai, Mountain View, CA (US); Preeti Agarwal, Los Altos, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 356 days.

(21) Appl. No.: 15/056,864

(22) Filed: Feb. 29, 2016

(51) Int. Cl.
*H04L 29/06* (2006.01)
*H04L 5/00* (2006.01)
*H04L 12/40* (2006.01)
*H04L 12/26* (2006.01)

(52) U.S. Cl.
CPC ........ *H04L 63/1425* (2013.01); *H04L 5/0055* (2013.01); *H04L 12/40* (2013.01); *H04L 43/08* (2013.01); *H04L 63/1416* (2013.01); *H04L 63/1466* (2013.01)

(58) Field of Classification Search
CPC ............. H04L 63/1425; H04L 63/1416; H04L 63/1466; H04L 12/40; H04L 5/0055; H04L 43/08; H04L 67/12
See application file for complete search history.

(56) References Cited

U.S. PATENT DOCUMENTS

| 8,027,352 | B2* | 9/2011 | Noumi | H04L 12/40026 370/218 |
| 9,380,070 | B1* | 6/2016 | Cain | H04L 63/1416 |
| 9,843,594 | B1* | 12/2017 | Evans | H04L 63/1408 |
| 9,900,292 | B2* | 2/2018 | Lee | H04L 63/0435 |
| 2003/0158983 | A1* | 8/2003 | Dalakuras | B60R 25/00 710/107 |
| 2008/0186870 | A1* | 8/2008 | Butts | H04L 41/0659 370/252 |

(Continued)

OTHER PUBLICATIONS

"EMI/ESD Protection Solutions for the Can Bus" Published Jun. 2014 (15 pages) http://www.onsemi.com/pub/Collateral/AND8169-D.PDF.*

(Continued)

*Primary Examiner* — Joseph P Hirl
*Assistant Examiner* — Thomas A Gyorfi
(74) *Attorney, Agent, or Firm* — Maschoff Brennan (57) ABSTRACT

A system and method for detecting an invalid packet on a Controller Area Network (CAN) bus having a plurality of CAN nodes coupled thereto is provided. The method may include monitoring a CAN identifier (CAN ID) of each packet sent by each CAN node. The method may also include determining whether to detect the validity using a time threshold, historical data, or an acknowledgement (ACK) bit. For example, when the CAN ID is unknown, the method may include the use of validity detection process based upon the ACK Slot bit. Accordingly, the method may include detecting the validity of each packet using the selected method determined. In addition, the method may include storing the detected validity in a database having a listing for valid packets (white list) and a listing for invalid packets (black list). Moreover, the method may include disabling the invalid packets.

6 Claims, 6 Drawing Sheets

(56) References Cited

U.S. PATENT DOCUMENTS

| | | | | |
|---|---|---|---|---|
| 2009/0240383 | A1* | 9/2009 | Hung | B60R 25/24 |
| | | | | 701/1 |
| 2012/0105637 | A1* | 5/2012 | Yousefi | H04N 7/183 |
| | | | | 348/148 |
| 2013/0104231 | A1* | 4/2013 | Niner | H04L 63/1416 |
| | | | | 726/23 |
| 2014/0328357 | A1* | 11/2014 | Fredriksson | H04J 3/0614 |
| | | | | 370/520 |
| 2015/0089236 | A1* | 3/2015 | Han | H04L 9/3242 |
| | | | | 713/181 |
| 2016/0021127 | A1* | 1/2016 | Yan | G06F 21/554 |
| | | | | 726/23 |
| 2016/0094312 | A1* | 3/2016 | Fredriksson | H04L 12/40 |
| | | | | 714/807 |
| 2016/0219024 | A1* | 7/2016 | Verzun | H04L 63/102 |
| 2017/0126711 | A1* | 5/2017 | Jung | G05B 15/02 |
| 2017/0142078 | A1* | 5/2017 | Lee | H04L 63/06 |

OTHER PUBLICATIONS

Pierre Kleberger et al. "Security Aspects of the In-Vehicle Network in the Connected Car" 2011 IEEE Intelligent Vehicles Symposium (IV), Baden-Baden, Germany, Jun. 5-9, 2011 (pp. 528-533).*

Marko Wolf et al. "Security in Automotive Bus Systems" Workshop on Embedded Security in Cars, 2004 (13 pages).*

Michael Muter et al. "A Structured Approach to Anomaly Detection in In-Vehicle Networks" 2010 Sixth International Conference on Information Assurance and Security (pp. 92-98).*

* cited by examiner

SYSTEM AND METHOD FOR IDENTIFYING AN INVALID PACKET ON A CONTROLLER AREA NETWORK (CAN) BUS

BACKGROUND

In a vehicular communication network, different Electronic Control Units (ECUs) of various components (such as the ignition, a steering wheel, transmission, gear controller, power controller, a vehicle control system, wheels, the display device, a braking system, wireless signal receiver, satellite positioning receiver, power source, and the like) may communicate with each other using the Controller Area Network (CAN) standard. This CAN standard is a message-based protocol designed to allow the microcontroller of the ECUs and other devices to communicate with each other in applications without a host computer. Positioned at each CAN node of the communication network, each ECU is ab e to send and receive messages, but not simultaneously. The CAN data transmission uses a lossless bit-wise arbitration method of contention resolution, where each frame possesses different priority levels as indicated by an arbitration field within the message (frame). Each message or frame includes a CAN identifier (ID) within the arbitration filed along with other information, such as, a control field, data field, cyclic redundancy check (CRC), acknowledgment (ACK) bits (including the ACK Slot bit and the ACK Delimiter bit) and other overhead. In case of an conflict, the arbitration method dictates that the message with the highest priority CAN ID is allowed to transmit.

Trouble arises when a hacker chooses to connect the CAN network, injecting invalid (falsified) messages (commands) having higher priority CAN IDs. At this point, the hacker is able to manipulate, for example, the car's engine, brakes, and security systems by wirelessly tapping into the CAN or any associated network coupled thereto. Further, by flooding the CAN network with a multiplicity of invalid messages, a hacker can stop valid messages from transmitting on the bus, which can cause severe issues. For example, when a hacker continues to flood the CAN bus with higher priority CAN IDs while the car is not on, the hacker may disable the car's ignition amongst many other functions. Further, flooding the CAN bus may result in starvation of required and expected periodic messages associated with a group of ECUs, forcing these to crash as well. It is within this context that the embodiments arise.

SUMMARY

In some embodiments, a system and method for detecting an invalid packet on a Controller Area Network (CAN) bus having a plurality of CAN nodes coupled thereto is provided. The method may include monitoring a CAN identifier (CAN ID) of each packet sent by each CAN node. The method may also include determining whether to detect the validity using a time threshold, historical data, or an acknowledgement (ACK) Slot bit. For example, when the CAN ID is unknown, the method may include the use of validity detection process based upon the ACK Slot bit. Accordingly, the method may include detecting the validity of each packet using the selected method determined. In addition, the method may include storing the detected validity in a database having a listing for valid packets (white list) and a listing for invalid packets (black list). Moreover, the method may include disabling the invalid packets.

In some embodiments, a hacking detection system is provided. The hacking detection system may include a memory coupled to a processor. The processor may be operable to monitor a CAN ID of each packet sent by each CAN node coupled to the CAN bus. The processor may be further operable to determine whether to detect the validity using a time threshold, historical data, or an acknowledgement (ACK) bit. For example, the processor may be operable to inspect the CAN ID and memory to determine whether the CAN ID is known to the system. If the CAN ID is unknown, the processor may be operable to select a validity detection process based upon the ACK Slot bit. Accordingly, the processor may be operable to detect the validity of each packet. Further, the processor may be operable to store the detected validity in memory, wherein the detected validity is associated with a listing for valid packets and a listing for invalid packets. Moreover, the processor may be operable to disable the invalid packets.

In some embodiments, a tangible, non-transitory, computer-readable media having instructions whereupon which, when executed by a processor, cause the processor to perform the router hijacking detection method described herein. The method may include monitoring a CAN identifier (CAN ID) of each packet sent by each CAN node. The method may also include determining whether to detect the validity using a time threshold, historical data, or an acknowledgement (ACK) bit. For example, when the CAN ID is unknown, the method may include the use of validity detection process based upon the ACK Slot bit. Accordingly, the method may include detecting the validity of each packet using the selected method determined. In addition, the method may include storing the detected validity in a database having a listing for valid packets (white list) and a listing for invalid packets (black list). Moreover, the method may include disabling the invalid packets.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The embodiments below describe a system and method for detecting an invalid packet on a Controller Area Network (CAN) bus having a plurality of CAN nodes coupled thereto is provided. The method may include monitoring a CAN identifier (CAN ID) of each packet sent by each CAN node. The method may also include determining whether to detect the validity using a time threshold, historical data, or an acknowledgement (ACK) bit. For example, when the CAN ID is unknown, the method may include the use of validity detection process based upon the ACK Slot bit. Accordingly, the method may include detecting the validity of each packet using the selected method determined. In addition, the method may include storing the detected validity in a database having a listing for valid packets (white list) and a listing for invalid packets (black list). Moreover, the method may include disabling the invalid packets.

This system and method described herein may use the ACK Slot bit from a message frame and the broadcast nature of the CAN bus to identify an invalid CAN ID. This approach makes the solution independent of any vehicle manufacturer, make, and/or model. In particular, the hacking detection system and method described herein is based upon the following principles of CAN. First, the CAN bus includes a broadcast model, where all of the Electronic Control Units (ECUs) at each CAN Node on the network can read all the messages. Further, each ECU has a list of CAN IDs they receive and/or transmit. Each ECU has the ability to ignore all other CAN messages. In particular, each CAN message frame includes a CAN ID and an ACK Slot bit along with other information. When any ECU sends a packet to the bus, ACK Slot bit is set to "1." In response, when a ECU receives the packet and verifies its accuracy, this ECU retransmits the packet on the CAN bus using the same CAN ID with the ACK bit set to "0." Most ECUs may continue broadcasting CAN messages in a periodic order along with a current payload.

The system and method for identifying invalid CAN IDs described herein includes a hacking detection module that can monitor the CAN traffic and identifies the maximum time period between two packets of the same CAN ID on a CAN bus. This maximum time period may be used as a "timeout period" or threshold. The hacking detection module can also maintain a valid listing of packets (white list) and an invalid listing of packets (black list), such that invalid CAN IDs used by hackers to attack the CAN network can be detected and disabled. While monitoring the traffic, if the hacking detection module finds a CAN frame with an unknown CAN ID, it can check its ACK Slot bit. When the ACK Slot bit is equal to "1," the hacking detection module can wait for a the predetermined time to find a consecutive CAN message having the same CAN ID and ACK bit set equal to "0." When the hacking detection module finds the consecutive CAN message with these properties, it can mark the CAN ID as valid and add the CAN ID to the list associated with valid packets (white list). In the alternative, when no CAN message is found for the same CAN ID within the maximum timeout period, the hacking detection module determines that the CAN ID is invalid, where the CAN ID can be added to the list associated with invalid packets (black list). Further, when the hacking detection module identifies that the ACK bit is set to "0" initially and there is no subsequent CAN ID, the packet is determined to be invalid and can be added in the black list.

Further, the hacking detection module may detect when a hacker is trying to flood the CAN network with invalid packets in an effort to partially or completely disable the vehicle. For example, when multiple messages having the same ACK Slot bit value are detected by the hacking detection module, the system determines that the message is the result of a hacker trying to flood the network. Without the disabling of these packets, the ignition may not work along with various other functions provided be various ECUs, which expect periodic messages. Therefore, the hacking detection module disclosed herein may designate the CAN ID associated with the flooding packets as invalid and place the CAN ID in a list associated with invalid packets.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
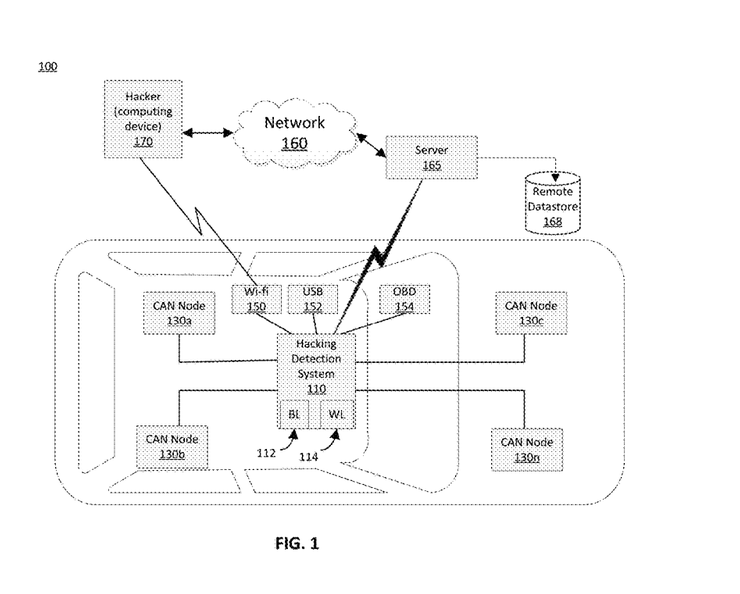
FIG. 1 is a block diagram of an exemplary vehicle communication system and network including the hacking detection system, in accordance with some embodiments.

Referring to FIG. 1, an exemplary embodiment of a vehicle communication system 100 and network including the hacking detection system 110 is shown. The vehicle communication system includes a vehicle having a CAN bus (not shown), a hacking detection system 110, CAN Nodes (130a, 130b . . . 130n), wireless receiver 150, Uniform Standard Bus (USB) receiver 152, and On-Board Diagnostic (OBD) receiver 154. The hacking detection system 110 can couple to the CAN Nodes (130a, 130b . . . 130n) indirectly through CAN bus. The CAN Nodes or Electronic Control Units (ECUs) (130a, 130b . . . 130n) may comprise sensors, actuators and other control devices. These CAN nodes (130a, 130b . . . 130n) may couple to the CAN bus directly or may wireless couple through a gateway to the CAN bus. Further, these CAN nodes (130a, 130b . . . 130n) may wirelessly couple to the CAN bus through a wireless connection to the hacking detection system 110. In one embodiment, a vehicle may have as many as 150 ECUs for various subsystems those related to the engine, transmission, cruise control, battery, electric power steering, audio systems, power windows, antilock braking/ABS, doors, airbags, mirror adjustment, and recharging systems for hybrid/electric cars, and the like. The hacking detection system 110, having local storage including a black list (invalid packet list) 112 and a white list (valid packet list) 114, may be a gateway allowing a standard computer to communicate over a USB or Ethernet port to the devices on a CAN network. The hacking detection system 110 may couple to the wireless receiver 150, such that the system may allow a computer or smart device to wirelessly communicate with other devices on the CAN network. Further, an OBD receiver 154 may couple to the hacking detection system 110 to enable various OBD devices to communicate with other devices at the CAN (130a, 130b . . . 130n). Optionally, the vehicle communication system may include a server 165 and a remote datastore 168 couple through a network to the hacking detection system 110. As such, the hacking detection system 110 may store CAN IDs associated with detected valid and invalid packets in the remote datastore 168, as will be described further with reference to FIGS. 4A-4D.

In operation, when a hacker at computing device 170 couples to the vehicle communication system 100 through network 160 or wirelessly through the wireless receiver 150, the hacking detection system 110 can detect invalid packets placed on the CAN bus and, in response, disable these packets. During a learning mode, the hacking detection system 110 may detect valid messages associated with known connected devices and generate valid and invalid packet lists. Further, the system 110 may detect a maximum time between successive packets transmitted from the same ECU and store this time as a threshold.

During a verification mode or normal operational mode, the hacking detection system 110 may monitor the CAN bus and identify the CAN ID associated with each packet. The hacking detection system 110 may further determine which validity determination process to use. That is, system 110 may determine whether it is most efficient and/or appropriate to use an ACK-based, a time-based, or a historical data-based detection process. In one embodiment, when any ECU sends a packet to the CAN bus, the ACK Slot bit is set to "1." In response, when any ECU receives this packet, it then transmits the packet with same CAN ID with the ACK Slot bit set equal "0." The system 110 may choose to use a time-based validity detection process that studies the time that it takes between the message being first transmitted from the ECU and the same message being retransmitted by a receiving ECU. For example in one embodiment, if the system 110 detects that this time exceeds the threshold determined in the learning mode, the hacking detection system 110 may make a determination that the packet is invalid. Accordingly, the detection system 110 may place the CAN ID in a list associated with invalid packets. Further, the hacking detection system 110 can identify the ACK Slot bit of the CAN frame to determine the validity of packets sent on the CAN bus. For example, if the hacking detection system 110 detects that the ACK Slot bit equals "1," the system 110 can monitor the packets on the CAN bus checking for another packet with the same CAN ID having an ACK Slot bit set to "0" for a predetermined time not to exceed the time threshold set during the learning mode. When the detection system 110 finds a packet corresponding to the same ECU with the ACK Slot bit set to "0," the system 110 can make a determination that the packet is valid. Accordingly, the hacking detection system 110 can store the CAN ID in the list associated with valid packets. In the alternative, if no packet having the same CAN ID is found on the CAN bus with the ACK Slot bit set to "0," the system 110 may determine that the packet is not valid and store the CAN ID in the list associated with invalid packets.

Further, the hacking detection system 110 may select the validity detection process that is based upon the use of historical data. In one embodiment, when the system 110 uses the historical data-based validity detection process, the local database may be accessed and compared with the CAN ID of the packet being observed. In addition, the system 110 may use a remote datastore to compare the CAN ID of an observed packet with a valid and invalid packet listing. For example, the hacking detection system 110 may monitor the CAN bus and identify the associated CAN ID of an observed packet. The system 110 may compare the CAN ID with the CAN IDs found in a valid and invalid packet list on a local datastore 122 or remote datastore 168.

Figure 2:
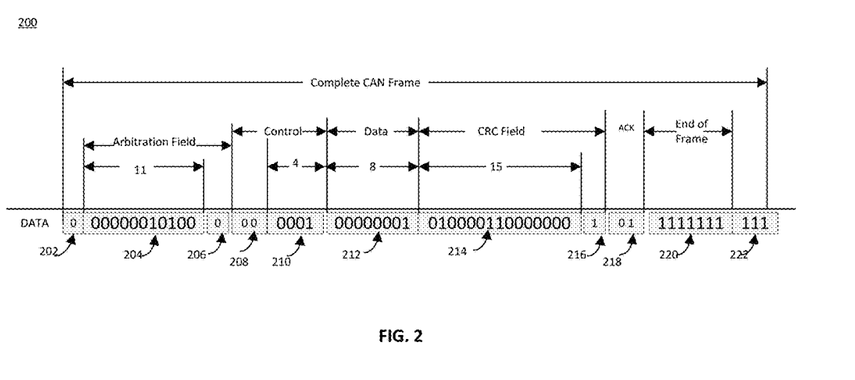
FIG. 2 is a diagram of an exemplary CAN data frame, in accordance with in some embodiments.

FIG. 2 is a diagram of an exemplary CAN data frame, in accordance with in some embodiments. The CAN data frame may be comprised of a start of frame bit (202), an arbitration field (204,206), control field (208,210), data field (212), CRC field (214, 216), ACK bits (218)(including the ACK Slot bit and the ACK Delimiter bit), and End of Frame field (220, 222). All frames begin with a start-of-frame (SOF) bit that denotes the start of the frame transmission. In one embodiment, the CAN bus of the system and method described herein may have four frame types including the data frame, the remote frame, the error frame, and the overload. In particular, the data frame represents that portion of the frame containing node data for transmission. The portion of the frame requesting the transmission of a specific identifier is represented by the remote frame. Further, the error frame represents the portion of the frame transmitted by any node detecting an error. Additionally, the overload frame is that portion of the frame that injects a delay between data and/or remote frame. The CAN network can be configured to work with any number of different message (or "frame") formats. In particular, the standard or base frame format (described in CAN 2.0 A and CAN 2.0 B), and the extended frame format (only described by CAN 2.0 B) may be used in the system and method described herein. The difference between the standard and extended frame formats is that the "CAN base frame" comprises a length of 11 bits for the identifier, and the "CAN extended frame" comprises a length of 29 bits for the identifier, having the 11-bit identifier ("base identifier") and an 18-bit extension ("identifier extension"). The distinction between CAN base frame format and CAN extended frame format is made by using the IDE bit, which is transmitted as dominant in case of an 11-bit frame, and transmitted as recessive in case of a 29-bit frame. The hacking detection system and method described herein is not restricted to a particular CAN standard and may use any CAN version or CAN format.

Figure 3:
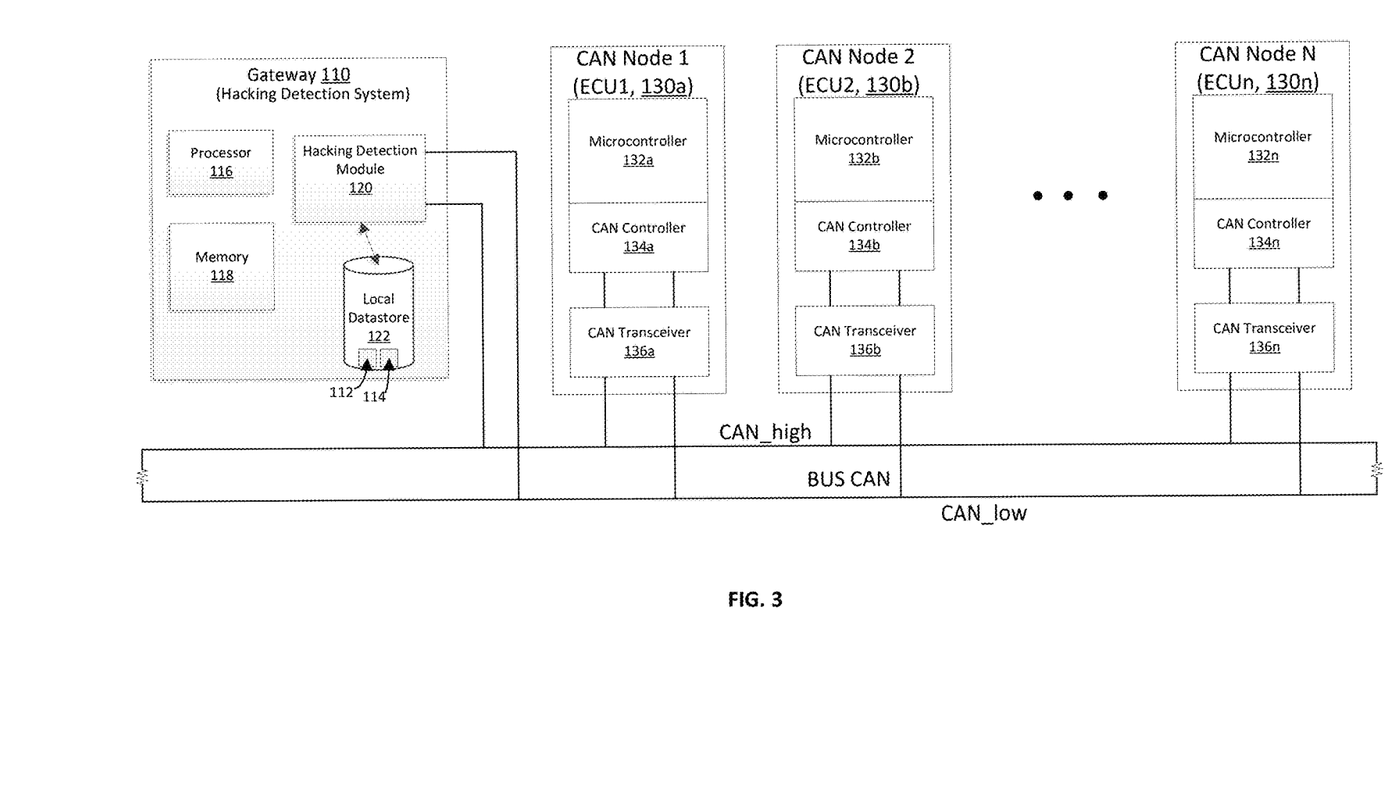
FIG. 3 is a system diagram of an exemplary hacking detection system coupled to the CAN bus, in accordance with in some embodiments.

FIG. 3 is a system diagram of an exemplary hacking detection system coupled to the CAN bus, in accordance with in some embodiments. The hacking detection system 110 may comprise a processor 116, memory 118, hacking detection module 120, and local datastore 122 having the black list 112 (invalid packet listing) and white list 114 (valid packet listing). The processor 116 may couple to memory 118 and hacking detection module 120; while hacking detection module 12 may couple to the local data store 122. The hacking detection module 120 may also couple indirectly to a remote data store 168 through a network server 165 as shown in FIG. 1. The hacking detection module 120 may couple to CAN bus at the high and low lines (CAN_high and CAN_low). The hacking detection module 120 may couple to receive each packet placed on the CAN bus by any of the CAN nodes (130a, 130b, . . . 130n). As noted supra, the CAN is a multi-master serial bus standard for connecting Electronic Control Units (ECUs), also known as CAN nodes. In one embodiment, two or more nodes may be required for communication on the CAN network. For example, the CAN network may comprise a plurality of CAN Nodes or ECUs. Each ECU (130a, 130b . . . 130n) may include a microcontroller (132a, 132b . . . 132n), CAN controller (134a, 134b . . . 134n), and a CAN transceiver (136a, 136b . . . 136n). Each ECU (130a, 130b . . . 130n) may couple to the CAN bus at the high and low lines (CAN_high and CAN_low). Specifically, each microcontroller (132a, 132b . . . 132n) may detect the meaning of each received message (packet) and may determine, in response to the packet received, what information needs to be transmitted. The CAN controller (134a, 134b . . . 134n) may store serial bits received from the CAN bus until an entire message is available, which can then be fetched by the corresponding microcontroller (132a, 132b . . . 132n). Additionally, the CAN controller (134a, 134b . . . 134n) may send each bit of a transmitted packet generated by the associated microcontroller (132a, 132b . . . 132n). The CAN transceiver (136a, 136b . . . 136n) may converts the data stream from CAN bus levels to levels of the CAN controller (134a, 134b . . . 134n), and vice versa. The complexity of either CAN node (130a, 130b . . . 130n) may range from a simple I/O device to an embedded computer with a CAN interface and complex software. The CAN node (130a, 130b . . . 130n) may also be a gateway (similar to gateway 110) allowing a standard computer to communicate over a USB or Ethernet port to the devices on a CAN network. As noted previously, a vehicle may have as many as 150 electronic control units (ECU) for various subsystems. The largest of processors may include the engine control unit. Other ECUs may implement transmission, cruise control, battery, electric power steering, audio systems, power windows, antilock braking/ABS, doors, airbags, mirror adjustment, and recharging systems for hybrid/electric cars, and the like. Some of the ECUs may form independent subsystems, where communications among all ECUs may still exist. A subsystem may need to control actuators or receive feedback from various sensors.

Figure 4A:
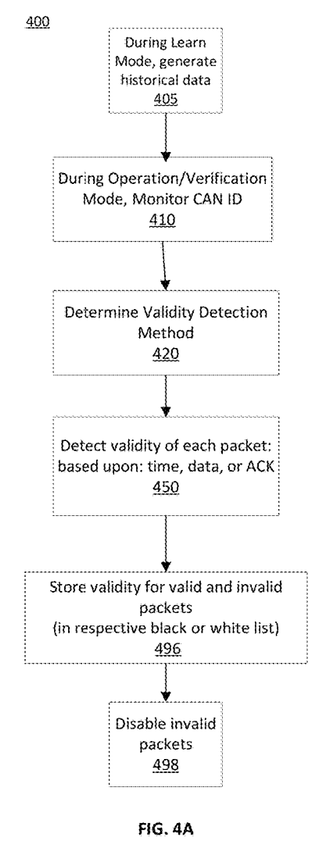
FIG. 4A is an exemplary flow diagram of an exemplary method of detecting an invalid packet on a CAN bus having a plurality of CAN nodes coupled thereto, in accordance with some embodiments.
Figure 4B:
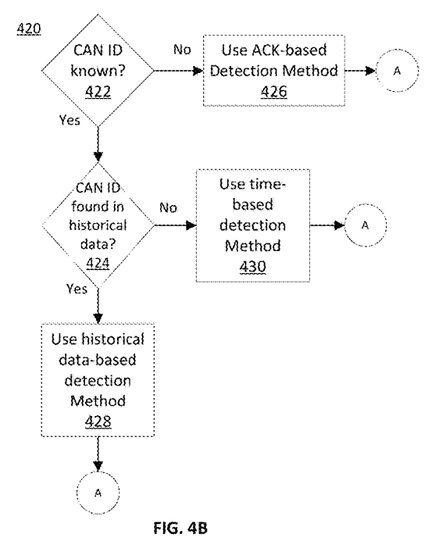
FIG. 4B is a flow diagram of a method for determining the validity detection method of the method illustrated in FIG. 4A, in accordance with some embodiments.
Figure 4C:
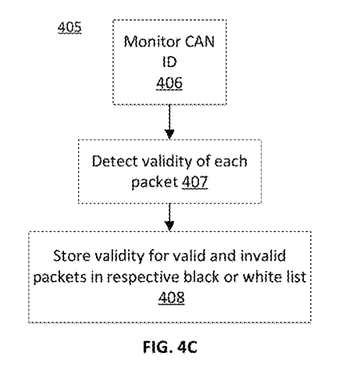
FIG. 4C is a flow diagram of a method for generating historical data during a learning mode for method illustrated in FIG. 4A, in accordance with some embodiments.

FIG. 4A is an exemplary flow diagram of an exemplary method 400 of detecting an invalid packet on a CAN bus having a plurality of CAN nodes coupled thereto, in accordance with some embodiments. During a learning mode in an action 405, the CAN hacking detection system 120 may generate historical data associated with valid and invalid packets. For example, as shown in FIG. 4C, which represents flow diagram of a method for generating historical data during a learning mode, CAN hacking detection system 110 may monitor the CAN ID of every packet in action 406. The hacking detection module 120 may detect the validity of each packet based upon the CAN ID in action 407. For example, the detection module 120 may include a policy or a set of instructions that detects that a packet is valid based upon the value of the ACK Slot bit or the timing between successive packets as will be explained with reference to the validity detection method of FIG. 4D. The hacking detection module 120, in action 408, may also store the detected validity in memory 118 or local data store 122. Particularly, the hacking detection module 120 may store the detected validity in a black list 112 which represents invalid packets or a white list 114 which represents valid packets, respectively. The detected validity may be stored remotely in a remote datastore 168, where the hacking detection system 110 transmits the detected validity through a network to a server 165 having a remote datastore 168.

Figure 4D:
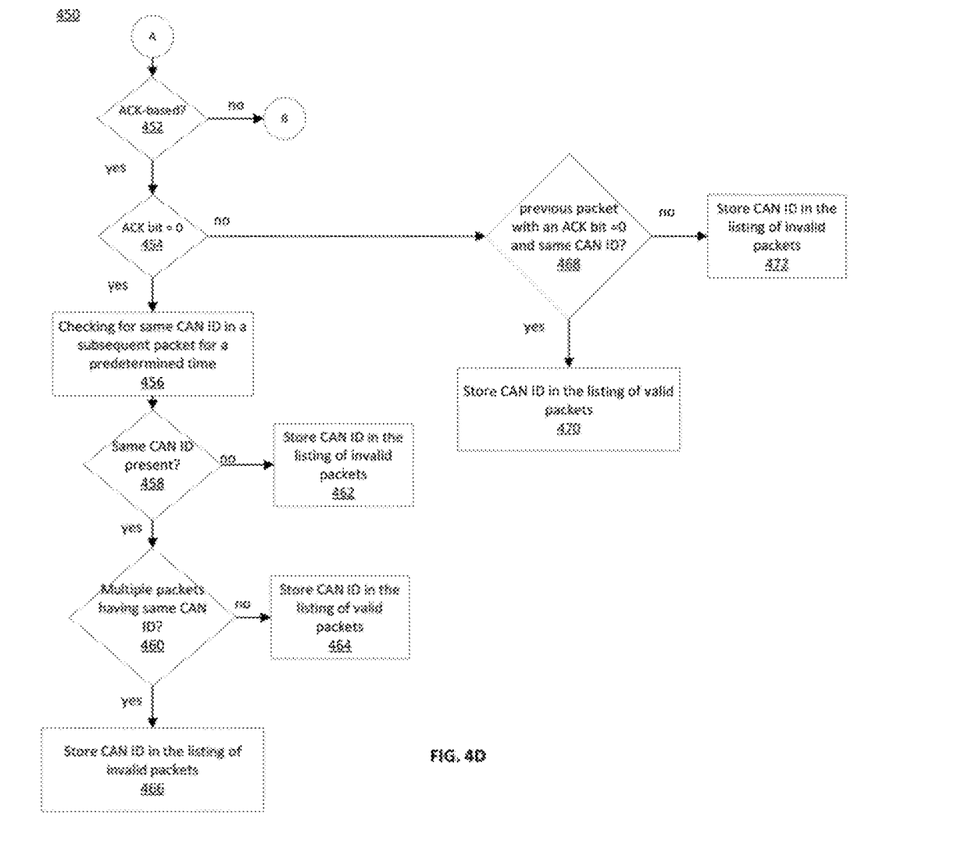
FIG. 4D is a flow diagram of a method for validity detection shown based upon the ACK Slot bit in FIG. 4A, in accordance with some embodiments.
Figure 4E:
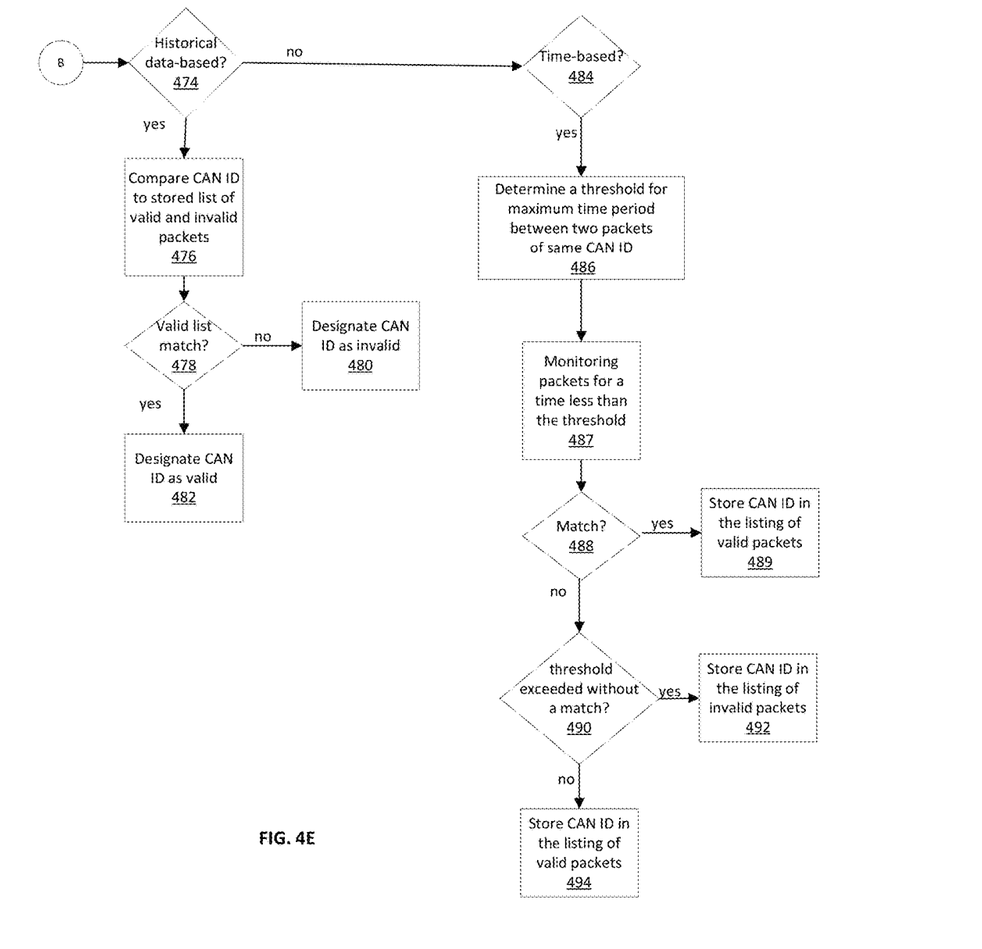
FIG. 4E is a flow diagram illustrating a continuation of the validity detection method shown in FIG. 4D based upon the historical data and time, in accordance with some embodiments.

Further, in an operation mode of FIG. 4A, the hacking detection system 110 may monitor the CAN ID of every packet in an action 420. In particular, the hacking detection module 120 may determine which validity detection process to utilize in determining the validity of the packet as indicated with specificity in FIG. 4B. FIG. 4B is a flow diagram of a method for determining the validity detection method of the method illustrated in FIG. 4A, in accordance with some embodiments. For example, the hacking detection module 120 may make the determination that the validity detection should be based upon the timing between successive packets (as shown in FIG. 4E) or the value of the ACK Slot bit (as shown in FIG. 4D as described below). In the alternative, the hacking detection module 120 may select the validity detection process that generates the validity based upon historical data (as shown in FIG. 4E as described below). More particularly, in a decision action 422, the hacking detection system 110 may identify whether the CAN ID is a known value. For example, the hacking detection module 120 may search the local database listing to find the CAN ID of a packet currently being observed during the operation mode. If the CAN ID cannot be found in either the local datastore or a remote datastore, the hacking detection module 120 may determine that the validity detection method to use will comprise a method that detect the validity based upon the value of the ACK in an action 426. If the CAN ID cannot be found in the historical data in either the local or remote datastore, yet is known, the hacking detection module 120 may determine that that validity detection process include a set of instructions that make the validity determination based upon a predetermined time between successive packets, for example in action 430. If, however, the CAN ID can be found in the in the historical data in either the local or remote datastore, the hacking detection module may make the determination to use a validity detection process that is based upon historical data as indicated in action 428.

Further, in an operation mode of FIG. 4A, the hacking detection system 110 may detect the validity of each packet in an action 450. Accordingly, the hacking detection module 120 may store the validity determination in a local datastore 122 or alternatively, in a remote datastore 168 in an action 496. Further, the hacking detection system 110 may disable the invalid packet in an action 498.

With reference to detecting the validity of the packet, as shown in FIG. 4D, which represents a flow diagram of a method for validity detection shown based upon the ACK Slot bit in FIG. 4A, in accordance with some embodiments. In decision action 452, continuing from point A of the process shown in FIG. 4B, the hacking detection module 120 seeks to determine whether the system 110 had selected the ACK-based validity detection method. If the ACK-based validity detection method was selected, the hacking detection module 120 determines whether the ACK Slot bit equals "0" in decision action 454. When the ACK bit equals "1," module 120 waits for a predetermined time and checks for the same CAN ID in a subsequent packet in action 456. When the same CAN ID is present as detected in decision block 458, module 120 may further detect whether there are multiple packets having the same CAN ID in decision block 460. This is representative, for example, of a hacker flooding the CAN network with invalid packets to block valid packets on the CAN network. Therefore, when the multiple packets exist, the hacking detection module 120 stores the CAN ID in the listing of invalid packets (black list) on the local datastore 122 or remote datastore 168. When the same CAN ID is not present, the hacking detection module 120 makes the determination that the packet is invalid and stores the packet in the listing corresponding to invalid packets (black list) in action 462. In the alternative in action 464, when the multiple of packets exist having the same CAN ID, the hacking detection module 120 makes the determination that the packet is valid and stores the packet in the valid packet listing (white list).

In decision block 468, the detection module 120 may determine whether a previous packet with an ACK Slot bit equals "1" when the ACK Slot bit of the observed packet equals "0." If a previous packet exists with an ACK Slot bit equal to "1," hacking detection module 120 determines that the packet is valid and stores the packet in the listing corresponding to valid packets (white list) in an action 470. In contrast, when the is no previous packet having an ACK Slot bit equal to "1", hacking detection module 120 determines that the packet is invalid and stores the packet in the listing corresponding to invalid packets (black list) in an action 472.

FIG. 4E is a flow diagram illustrating a continuation of the validity detection method shown in FIG. 4D based upon the historical data and time, in accordance with some embodiments. When the hacking detection module 120 determines that the system has not selected the ACK-based, in decision block 474 the module 120 determines whether the historical data-based method of validity detection is chosen. When the method of historical data-based validity detection is selected, hacking detection module 120 in an action 476 may compare the CAN ID to a stored listing of valid and invalid packets, whether the listing is local or remote. If there is a valid listing match, the detection module 120 may designate the CAN ID as valid in action 482. In the alternative, when the match is detected that corresponds with the invalid listing, the detection module 120 may designate the CAN ID as an invalid packet in action 480.

When the validity detection process is time-based as detected in decision block 484, the hacking detection module 120 may determine a threshold for a maximum time period between two packets having the same CAN ID in an action 486. Further, the hacking detection module, may monitor packets for a time less than the threshold and detect whether there is a match in actions 487 and 488. If there is a match, the detection module 120 may store the CAN ID in the listing associated with valid packets in action 489. If no match is detected, where the threshold is exceeded without a match, the detection module 120 can make a determination that the packet is invalid and thereby store the packet in the listing associated with invalid packets in action 492. In the alternative if there is a match found prior to the time exceeding the threshold, hacking detection module 120 determines that the packet is valid and stores the packet in the listing associated with the valid packets in action 494.

Figure 5:
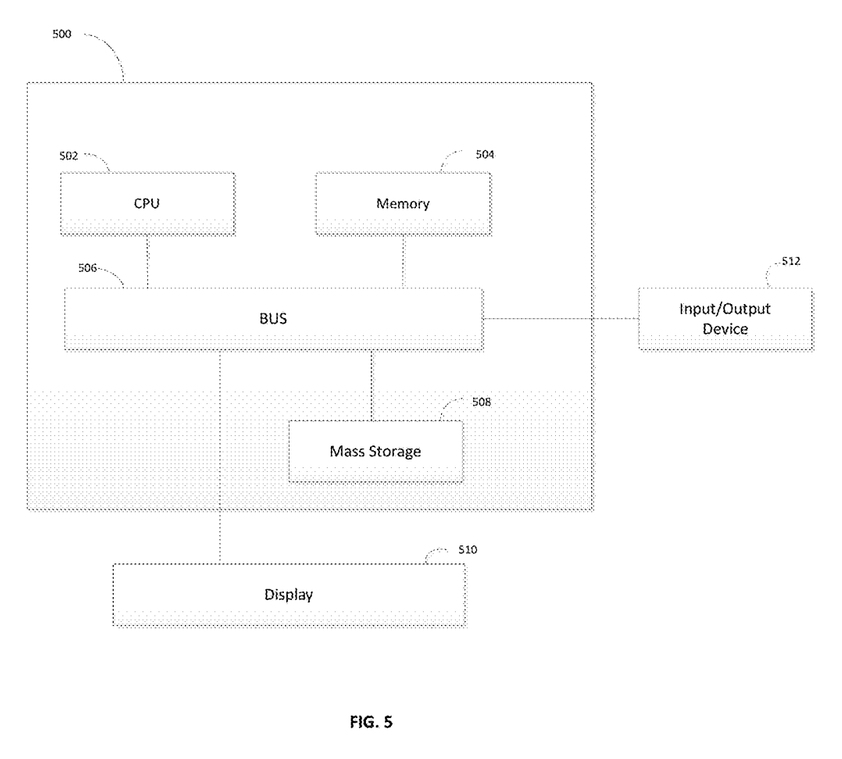
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for performing the hacking detection in accordance with some embodiments. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4. The code embodying this functionality may be stored within memory 504 or mass storage device 508 for execution by a processor such as CPU 502 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/ components include structure (e.g., circuitry) that performs the task or tasks during operation. As such, the unit/circuit/ component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/ component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting an invalid packet on a Controller Area Network (CAN) bus having a plurality of CAN nodes coupled thereto comprising:
   monitoring a CAN identifier (CAN ID) of each packet sent by each CAN node;
   identifying whether an ACK Slot bit of a monitored packet is set to "1" or "0;"
   monitoring, for a predetermined time, in response to the ACK Slot bit set to "1," for a subsequent packet possessing the same CAN ID;
   storing, in response to the subsequent packet possessing a same CAN ID, the CAN ID in a first database having a listing for valid packets;
   storing, in response to the subsequent packet possession a different CAN ID, the different CAN ID in second database having a listing for invalid packets;
   monitoring, in response to the ACK Slot bit set to "0," for a same CAN ID having an ACK Slot bit equal to "0" from a previously monitored packet;
   storing, in response to an absence of the previously monitored packet having the same CAN ID having the ACK Slot bit equal to "1," the CAN ID of the CAN ID having the Slot bit equal to "0" in the second database; and
   disabling the invalid packet.

2. The method of claim 1, wherein prior to identifying whether an ACK Slot bit of the monitored packet is set to "1" or "0":
   detecting whether the packet possesses a CAN frame with an unknown CAN ID;
   designating, in response to the unknown CAN ID, the validity detection to be based upon the ACK Slot bit; and
   designating, in response to a known CAN ID, the validity detection to be based upon a time threshold or historical data.

3. The method of claim 1, further comprising:
   monitoring each CAN frame for a plurality of packets ACK Slot bit equal to "1" having the same CAN ID; and
   storing, in response to plurality of packets possessing the same CAN ID having an ACK Slot bit equal to "1," the CAN ID in the listing for invalid packets.

4. A non-transitory computer-readable medium including code for performing a method, the method comprising:
   monitoring a CAN ID of each packet sent by each CAN node coupled to a CAN bus;
   identifying whether an ACK Slot bit of a monitored packet is set to "1" or "0;"
   monitoring, for a predetermined time, in response to the ACK Slot bit set to "1," for a subsequent packet possessing the same CAN ID;
   storing, in response to the subsequent packet possessing a same CAN ID, the CAN ID in a first database having a listing for valid packets;
   storing, in response to the subsequent packet possession a different CAN ID, the different CAN ID in second database having a listing for invalid packets;
   monitoring, in response to the ACK Slot bit set to "0," for a same CAN ID having an ACK Slot bit equal to "0" from a previously monitored packet;
   storing, in response to an absence of the previously monitored packet having the same CAN ID having the ACK Slot bit equal to "1," the CAN ID of the CAN ID having the Slot bit equal to "0" in the second database; and
   disabling the invalid packet.

5. The computer-readable medium of claim 4, wherein prior to identifying whether an ACK Slot bit of the monitored packet is set to "1" or "0":
   detecting whether the packet possesses a CAN frame with an unknown CAN ID;
   designating, in response to the unknown CAN ID, the validity detection to be based upon the ACK Slot bit; and
   designating, in response to a known CAN ID, the validity detection to be based upon a time threshold or historical data.

6. The computer-readable medium of claim 4, further comprising:
   monitoring each CAN frame for a plurality of packets ACK Slot bit equal to "1" having the same CAN ID; and
   storing, in response to plurality of packets possessing the same CAN ID having an ACK Slot bit equal to "1," the CAN ID in the listing for invalid packets.

* * * * *